(12) United States Patent
Squibb et al.

(10) Patent No.: US 7,814,367 B1
(45) Date of Patent: Oct. 12, 2010

(54) METHOD AND SYSTEM FOR TIME ADDRESSABLE STORAGE

(75) Inventors: Mark Squibb, Bellvue, CO (US); F. Roy Carlson, Jr., Westborough, MA (US); Nick Burke, San Francisco, CA (US)

(73) Assignee: Double-Take Software Canada, Inc., Montreal, Quebec (CA)

( * ) Notice: Subject to any disclaimer, the term of this patent is extended or adjusted under 35 U.S.C. 154(b) by 878 days.

(21) Appl. No.: 11/273,665

(22) Filed: Nov. 14, 2005

Related U.S. Application Data

(60) Provisional application No. 60/627,479, filed on Nov. 12, 2004, provisional application No. 60/627,478, filed on Nov. 12, 2004, provisional application No. 60/627,544, filed on Nov. 12, 2004.

(51) Int. Cl.
   *G06F 11/00* (2006.01)
(52) U.S. Cl. .................. 714/19; 707/602; 707/620; 707/624; 707/625; 707/648; 707/672; 707/683; 707/684; 707/787; 714/6; 714/15; 714/16; 715/229; 715/968
(58) Field of Classification Search .............. 714/15, 714/16, 19, 6; 707/20–204; 715/229, 968
   See application file for complete search history.

(56) References Cited

U.S. PATENT DOCUMENTS

| 5,086,502 | A | * | 2/1992 | Malcolm ..................... 714/8 |
| 5,354,098 | A | | 10/1994 | Mills |
| 5,372,386 | A | | 12/1994 | Mills |
| 5,400,253 | A | | 3/1995 | O'Connor |
| 5,479,654 | A | | 12/1995 | Squibb |
| 5,701,480 | A | * | 12/1997 | Raz ............................ 718/101 |
| 5,729,743 | A | | 3/1998 | Squibb |
| 5,745,906 | A | | 4/1998 | Squibb |
| 5,754,782 | A | * | 5/1998 | Masada ..................... 709/213 |
| 5,831,617 | A | | 11/1998 | Bhukhanwala |
| 5,857,204 | A | | 1/1999 | Lordi et al. |
| 5,893,119 | A | | 4/1999 | Squibb |
| 6,016,553 | A | * | 1/2000 | Schneider et al. ............ 714/21 |
| 6,041,420 | A | | 3/2000 | Skarpelos et al. |
| 6,144,375 | A | * | 11/2000 | Jain et al. ................... 715/251 |
| 6,154,725 | A | | 11/2000 | Donner |
| 6,158,019 | A | * | 12/2000 | Squibb ........................ 714/13 |
| 6,185,699 | B1 | * | 2/2001 | Haderle et al. ............... 714/19 |
| 6,189,016 | B1 | * | 2/2001 | Cabrera et al. ............. 707/203 |

(Continued)

OTHER PUBLICATIONS

Towers, "Visual quick start guide Dreamweaver 4 for Windows and Macintosh", Apr. 2005, Peachpit Press, pp. 1-15.*

(Continued)

*Primary Examiner*—Robert Beausoliel
*Assistant Examiner*—Jeison C Arcos
(74) *Attorney, Agent, or Firm*—Hogan Lovells US LLP

(57) ABSTRACT

Method and system for allowing temporal navigation or time travel of data or data object across time are disclosed. In one embodiment, events that affected data objects are retrieved and inversed to revert the data objects back to a selected point-in-time, forward events are applied to move data objects to forward point-in-time. A sliding bar or a time dial allows a user to move data objects back and forward in time. Events that are applied may be a selected subset of events, altered events, new events, or events generated synthetically or any combinations thereof, for instance, to create counterfactual history.

10 Claims, 4 Drawing Sheets

U.S. PATENT DOCUMENTS

| | | | |
|---|---|---|---|
| 6,216,164 B1 | 4/2001 | Zaremba, Jr. | |
| 6,301,677 B1 | 10/2001 | Squibb | |
| 6,400,378 B1* | 6/2002 | Snook | 715/716 |
| 6,405,217 B1 | 6/2002 | Lee | |
| 6,411,307 B1* | 6/2002 | Rosin et al. | 715/716 |
| 6,460,052 B1* | 10/2002 | Thomas et al. | 707/203 |
| 6,615,224 B1 | 9/2003 | Davis | |
| 6,618,794 B1* | 9/2003 | Sicola et al. | 711/154 |
| 6,631,374 B1* | 10/2003 | Klein et al. | 707/638 |
| 6,704,755 B2* | 3/2004 | Midgley et al. | 707/204 |
| 7,069,401 B1* | 6/2006 | Noonan et al. | 711/162 |
| 7,266,290 B2* | 9/2007 | Shiah et al. | 386/125 |
| 2002/0002567 A1* | 1/2002 | Kanie et al. | 707/513 |
| 2002/0174139 A1* | 11/2002 | Midgley et al. | 707/204 |
| 2003/0033296 A1* | 2/2003 | Rothmuller et al. | 707/3 |
| 2003/0131253 A1* | 7/2003 | Martin et al. | 713/200 |
| 2003/0135703 A1* | 7/2003 | Martin et al. | 711/162 |
| 2003/0167380 A1* | 9/2003 | Green et al. | 711/136 |
| 2004/0117572 A1* | 6/2004 | Welsh et al. | 711/162 |
| 2004/0193945 A1* | 9/2004 | Eguchi et al. | 714/6 |
| 2004/0267835 A1* | 12/2004 | Zwilling et al. | 707/202 |
| 2005/0080804 A1* | 4/2005 | Bradshaw et al. | 707/102 |
| 2005/0216527 A1* | 9/2005 | Erlingsson | 707/202 |
| 2005/0251540 A1* | 11/2005 | Sim-Tang | 707/202 |
| 2005/0251738 A1* | 11/2005 | Hirano et al. | 715/514 |

OTHER PUBLICATIONS

Schulze, "Macromedia Fireworks MX Training from the Source", Jul. 2002, Macromedia Press, pp. 1-7.*

Rudner, "Fireworks MX Fundamentals", Aug. 2002, New Riders, pp. 1-5.*

Thornton, "Audioentric Interface Design: A building blocks approach", Jul. 2003, pp. 1-4.*

Stonebraker et al. "The Postgres Next-Generation Database Management System," Oct. 1991, pp. 78-92.

Soules et al. "Metadata Efficiency in Versioning File System," Apr. 2003, pp. 1-16.

Jefferson, "Virtual Time," Jul. 1985, pp. 404-425.

Hitz et al. "File System Design for an NFS," 13 pages.

Nørvåg et al. "Write Optimized Object-Oriented Database Systems," Nov. 1997, 9 pages.

Ellard et al. "The Utility of File Names," 15 pages.

Nørvåg, The Vagabond Approach to Logging and Recovery in Transaction-Time Temporal Object Database Systems, 22 pages.

Rosenblum et al. "THe Design and Implementation of a Log-Structured File System," Jul. 1991, pp. 1-15.

* cited by examiner

METHOD AND SYSTEM FOR TIME ADDRESSABLE STORAGE

CROSS-REFERENCE TO RELATED APPLICATIONS

This application claims the benefit of U.S. Provisional Patent Application No. 60/627,479 entitled Interface to Reconcile a Data Environment and a Live Environment Using Past and Present Data, filed on Nov. 12, 2004, U.S. Provisional Patent Application No. 60/627,478 entitled Interface and Method to Reverse a Plurality of Events to a Subset of Objects in a File System, filed on Nov. 12, 2004, and U.S. Provisional Patent Application No. 60/627,544 entitled Interface to Access a Time Addressable File System, filed on Nov. 12, 2004, which applications are incorporated herein by reference in their entirety as if the disclosures are fully set forth herein.

TECHNICAL FIELD

The present application relates to computer systems and more particularly to enabling time traversal of data, for example, in computer systems.

BACKGROUND

File systems store the most recent data. File systems can be restored to an earlier state from saved backup media. In database systems, earlier database transaction can be retrieved using transaction logs and backup retrieval. Other backup and restore mechanisms are available for computer system. It would however be desirable to allow data or file system environment that can be moved back and forth in time, for instance, to enable a user to view different data change events that occurred through time.

As an example, known information systems incur discrepancy as a result of many different kinds of causal events. A discrepancy normally means that the information system referred to as a data environment used to manage real world environment (live environment) is inconsistent with the live environment. It is uncommon for discrepancies to be detected immediately. Typically, a significant time lapses before a discrepant condition is recognized. This lapse can cause the discrepancy to compound or propagate into a wider context. Events that would not normally occur or should not occur do happen as a result of the causal event that caused the discrepancy. In addition, multiple causal events may occur in a system causing a cascade of discrepancies. Cascade discrepancies may create difficult to reconcile conditions.

A data environment contains representations of elements in a live environment. An example of a live environment is an inventory environment. Data environment may include a computer or the like and data stored and processed with the computer. The data represents the live environment. The computer includes programs, modules, code of instructions, or the like or other means to manipulate the data, for instance, in response to some stimulus from the live environment. Accordingly, it would be desirable to have data environment that provides time traversal facilities, for instance, to enable discovery as well as recovery of discrepant conditions in live and data environments.

SUMMARY

Method and system for moving data through time are disclosed. In one embodiment, the method includes at least determining a point-in-time to which to travel. One or more data objects to navigate in time is also determined. Reference time that reflects a current state of the one or more data objects is further determined. Using a journal of events, the reference time and the point-in-time, one or more events associated with the one or more data objects are determined. The one or more events are applied to the one or more data objects.

The point-in-time may be backward in time from the reference time or forward in time from the reference time. If the point-in-time is backward in time, the method for example may include retrieving one or more events that changed the one or more objects during the time between the reference time and the point-in-time and constructing one or more inverse events from the one or more events to revert the one or more data objects to the point-in-time.

If the point-in-time is forward in time, the method for example may include retrieving one or more events that changed the one or more objects during the time between the reference time and the point-in-time from the journal of events. The method may also include selectively applying a subset of the one or more events to the one or more data objects. In another embodiment, the method may include changing parameters in one or more events and applying the changed one or more events to the one or more data objects.

Yet in another embodiment, the method may include creating point-in-time images of the data objects and using the point-in-time images as basis to which to apply further events.

Still yet, the method may include changing data through time backward or forward or combination of thereof at a block layer or a file system layer or the like and notifying an application layer or the like above the block layer or file system layer or the like to discard a cached memory of the data or not to cache the data.

A system for moving data through time in one embodiment may include a plurality of data objects and an event journal that has at least a plurality of events. The plurality of events is time labeled and represents at least changes made to the plurality of data objects. An interface module is operable to allow selection of a temporal state to which one or more data objects in the plurality of data objects should be reverted. A processor is operable to create one or more inverse events from the plurality of events. The one or more inverse events are operable to revert at least one of the plurality of data objects to a selected temporal state. The processor is further operable to apply the one or more inverse events to revert the at least one of the plurality of data objects to the selected temporal state.

In another embodiment, the system may further include one or more point-in-time images of respective one or more data objects. The processor is operable to apply one or more events to the one or more point-in-time images to move the one or more data objects forward in temporal state. The temporal state may be forward in time or backward in time.

The plurality of data objects may include a file system, a database system, a block level volume, a directory, a file, or combinations thereof. The plurality of data objects may include a copy of file system, a database system, a block level volume, a directory, a file, or combinations thereof. The plurality of data objects may include a virtualization of file system, a database system, a block level volume, a directory, a file, or combinations thereof. For instance, when reference versions of data objects are moved through time, the data that represents the object at the new time may be the reference object, a copy of the reference object or a virtualization of the reference object, or any combinations thereof.

Further features as well as the structure and operation of various embodiments are described in detail below with ref-

DETAILED DESCRIPTION

Method and system for time travel of data system are disclosed. For instance, the method and system allows a return path back to an arbitrary earlier time in the history of a file system for a plurality of data objects. An arbitrary earlier time, for example, refers to a desired time to which a user, for example, would like to return the data. In an exemplary embodiment, an application program interface (API) allows a user to slide data or contents of a file system back and forth in time. API, for instance, may include a graphical user interface (GUI) that allows a user to use a scroll bar and/or slider to move the data through time. The API may also include a GUI that allows a user to rotate a time dial to navigate the data through time.

Figure 1:
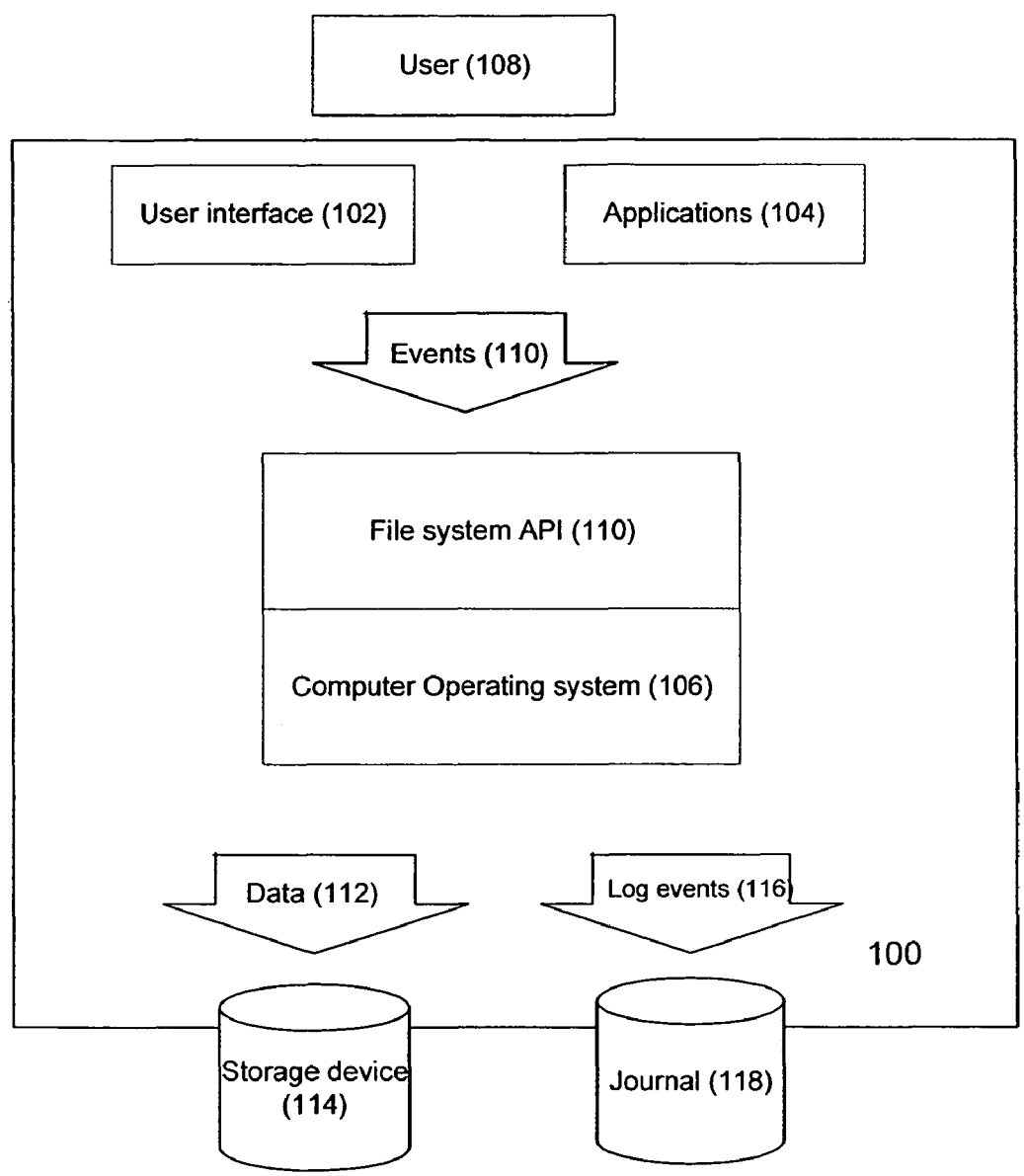
FIG. 1 is an example of a diagram illustrating a system of the present disclosure in one embodiment.

FIG. 1 is an example of a diagram illustrating a system of the present disclosure in one embodiment. A computer system 102 may include a user interface 104, one or more application programs 106 running on the computer system 100. A user 108, for example, may trigger a user event 110 that modifies or otherwise affects a file system. The event 110 may be triggered by an action, for instance, a data write, delete, update, an attribute change on data object or file, or any other action that affects a file system. The actions may be triggered via, for example, user interfaces 102, application programs 104, or a file system API 110, combination thereof, etc.

Typically, the file system API 110 communicates with the computer operating system 106 to store data 112 in a storage device 114. Likewise, storage event records 116 are recorded into a journal 118. The journal 118 accumulates the history of events associated with data in the storage device 114, including at least time stamp for each event such as a write event. Optionally, information about a user 108 and application programs 104 that triggered the event 110 may also be logged in the journal 118. A person of ordinary skill in the art will recognize that the components described herein may reside within one computer system or may be distributed among different computer systems and networks.

The method and system in an exemplary embodiment determines what changes are needed to the data in the storage 114 in order to return one or more data, for instance, a subset of the storage 114, to an earlier time. Time reversal may be performed by a user 108 directing such an action, an application program 104, or by any other means.

In an exemplary embodiment, the method and system uses file or data object events to roll back selected events in a file system. Likewise the events may be rolled forward as desired. Thus, the file system's state can be rolled back and forward in time as desired.

Briefly, a journal of a file system includes a history of file events, for instance file write events. Creating and incorporating a write event journal into a computer system is generally known. For instance, the Windows operating system provides installable file systems drivers which can create journals as needed.

Tables 1, 2, and 3 illustrate examples that describe a sequence of data written to a file over time and how they may be rolled back and forth. Examples are provided to describe an exemplary embodiment. These examples are representative and are not intended to restrict or limit the scope of the invention. For instance, the single byte strings in the following example may be replaced with variable length strings. It should be apparent to one skilled in the art that the representative examples provide clarity and do not restrict the invention or restrict it to any particular operating system or application.

In Table 1, time zero represents the original data stored in a file. A stream may exist in a different state as of each write event. It is also possible to extract and undo changes to return the "final" state reflected in state number 8 to any previous state by constructing an inverse change to convert the final state into any earlier state.

This example describes time as an ordinal sequence for simplicity. It will be apparent to one skilled in the art that each event in a journal of events may be sequenced in different ways, for example, by literal time, by a sequence representing time, or the like.

TABLE 1

| Time | User | Position | Span | Text | Stream |
|------|------|----------|------|------|--------|
| 0 | Mike | 0 | 11 | "Hello World" | "Hello World" |
| 1 | john | 1 | 1 | "o" | "Hollo World" |
| 2 | ron | 1 | 1 | "p" | "Hpllo World" |
| 3 | ron | 1 | 1 | "q" | "Hqllo World" |
| 4 | john | 1 | 1 | "r" | "Hrllo World" |
| 5 | mike | 1 | 1 | "s" | "Hsllo World" |
| 6 | john | 1 | 1 | "t" | "Htllo World" |
| 7 | ron | 1 | 1 | "u" | "Hullo World" |
| 8 | mike | 1 | 1 | "v" | "Hvllo World" |

Briefly, in order to produce the inverse change from the final data state "Hvllo World" to the data state at time 4, a search is performed in the event series for precedent data.

Since this example overwrites the character at position 1 at each write event, 8,7,6,5, the precedence search finds the precedent moment just before the target time. In this example, time 4 is coincident with the letter "r" written to position 1. In this case "r" is the precedent data for time 4, therefore, the inverse change from the event "Hvllo World" is a write event of "r" at position 1. This converts "Hvllo World" to "Hrllo World". It should be apparent to one skilled in the art that the precedent search applies to any character that was overwritten after time number 4. In each case, the data that preceded the event constructs the inverse change, which can then be applied to the stream. In an exemplary embodiment, an event in a journal includes enough information so that the data can be moved backward and/or forward. For instance, to enable data to be moved backward, the data that was there before the event happened would be saved so that it can be replaced. For example, if a write happened to a data object at offset n and of length m, then before that write the previous contents at offset m length n would be read and stored prior to the write, so they can be restored in the backwards direction. Such information would not be needed to travel forward direction It will also be apparent to one skilled in the art that the inverse change can be used to revert either the original data or a copy on another machine or a virtualized image of the data or the like to reconstitute the data state as of state number 4.

Another exemplary attribute described in the present application is time marking. The following series of events shown in Table 2 illustrates an exemplary embodiment that enables time travel. The following event table shown in Table 2 is a continuation of Table 1 illustrating sequential creation of a time mark, application of an inverse event.

TABLE 2

| Time | Position | Span | Text | Stream |
|------|----------|------|------|--------|
| 8 | 1 | 1 | "t" | "Htllo World" |
| 9 | 1 | 1 | Create Time Mark | "Htllo World" |
| 10 | 1 | 1 | "r" | "Hrllo World" |

The event entry at time 10 is entered as a result of the data rolled back to time 4 as described with reference to Table 1. Optionally, an event entry shown at time 9 may be entered to create a time mark. The time mark, for instance, is a symbolic means to label times of interest. Time mark can include labels such as "before starting upgrade" or "after batch update" or other descriptional information.

In one embodiment, the time mark enables reversal of the reversal effectively canceling the change. Table 3 illustrates this sequence showing precedent analysis for the time marked "Create Time Mark". The data from time 8 now becomes precedent, therefore inverse change search produces an inverse change of a write event of "t" at position 1. Application of this event converts time back to the pre-reverted value as illustrated in Table 3. It will be apparent to one skilled in the art that the data at time number 11 is equivalent to the data at time number 8. Table 3 Thus, in one embodiment, one or more time marks may be entered into event journal. The time marks can be used to move data back and/or forward. For instance, a desired time mark can be searched for, precedent data determined for the desired time mark, and data reverted to a state as of that desired time mark, as described above. Time marks provide another way for time travel in the present disclosure, in addition to being able to use a time or an event sequence number or the like.

| Time | Position | Span | Text | Stream |
|------|----------|------|------|--------|
| 11 | 1 | 1 | "t" | "Htllo World" |

Recovery situations may increase damage to data. Isolation of changes and the ability to perform bi-directional time traversal and selectively retry recovery and restart is one novel and very useful attribute in the present disclosure. Furthermore, from the state of having traveled back in time, new data in events or new synthetic events, which may be more representative of the live system, may be applied for counter factual history in the data system.

This example shows byte-sized writes using human readable text. The example can also apply to all data regardless of data object. The method and system of the present disclosure is also applicable to write events using fixed unit or block sizes in a data store or the like or any combination thereof. The method and system of the present disclosure is further applicable to variable length units for events such as write events, metadata events, namespace events in applications, file systems, and database management systems (DBMS) or any combination thereof.

In another embodiment, it is further possible to use supplemental criteria to extract inverse changes. Referring back to table 1, it is for example possible to eliminate all changes made by "mike" from the final data by precedent analysis. This example would discard the final write made by mike from the result. The inverse event in this case may compose an inverse change by selecting precedent data from all of "mike" transactions in the final data. In this case, the inverse data to reverse illegitimate or unwanted changes by mike would be "u" at position 1. This change reverses the final change made by "mike" to the precedent data written by "ron". In another embodiment, all changes made by "mike" may be reversed, then the changes may be reapplied with different values.

It is useful to note that the method and system of the present disclosure apply to any number of files in a file system across all time in the file system for which a journal exists. Certain embodiments may represent the entire write history as a journal. In this case, it should be apparent to one skilled in the art that the entire history, as well as the ability to extract inverse changes for all times in the past is possible in an exemplary embodiment.

Time travel in a data environment allows, for example, an application to change data directly at a file system level without the new data being written from the application to the filesystem. This is different from a typical computing environment where the changes occur at an application or user level. For instance, using an out-of-band interface, the application can change the time represented by the filesystem. This is different from a typical computing environment where the file system only changes as a result of application on top of the file system. That is, this is different from a typical computing environment where the changes occur in-band, through the read write interface for example.

As another example, through out-of-band mechanisms such as ioctls, signals, rpc, or any other ipc mechanism, a time enabled volume manager may be instructed to change the time represented by the volume. Normally volume contents would be changed by writes from a filesystem (or DBMS or any other program) above the volume manager. This out-of-band-time travel control mechanism leads to what is being referred to as a "write-inverted stack." The filesystem needs to be notified that the volume manager has changed its contents.

In another embodiment, time may be included as a first class data object in the interfaces all the way up and down the stack. In that case the control path again lies within the storage stack, in-band for time travel. For example, a read would have a time associated with it. That layer would know it was getting something time based.

Figure 2:
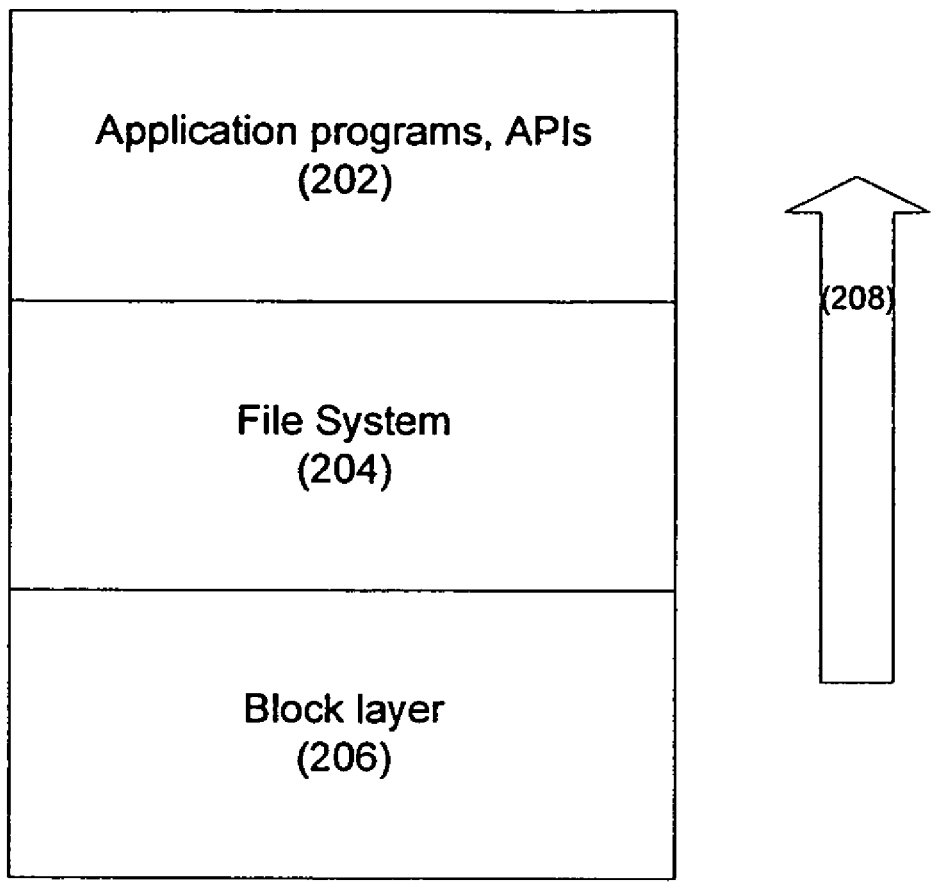
FIG. 2 is a block diagram illustrating layers in a computing environment that affect computer system data, for example, a file system in one embodiment.

FIG. 2 is a block diagram illustrating layers in a computing environment that affect a file system in one embodiment. Traversing time in a file system modifies the storage underlying one or more applications through means other than a typical normal write path, that is typically from top layers such as applications 202 down to file system 204 and block layers 206. This is because, for example, the files represented within the application are time inconsistent with the files in the file system, unless for example, the application time traveled to the same place.

Inconsistencies may occur between the application and the file system if an application is not aware that its underlying storage can time travel. This is also true if the time travel happens at the block layer 206. An exemplary embodiment of the method and system of present disclosure allows the file system 204 on top of the block layer 206 to invalidate its caches of data from the block layer 206. This feature that storage stack state can change via "writes" from lower layers of the stack is referred to as a write-inverted stack as shown by the arrow 208 in FIG. 2.

Typically, for example, a user running an application program 202 such as word processor, database program, or other programs performs actions on files or data objects. The changes then descend down to the file system level 204 where the changes are saved or stored, for example, using a block layer 206. Conversely, in the present disclosure, an inverted write stack is introduced where changes in the file system level 204 rise up to the application level 202. Briefly, block layers 206 generally includes devices such as disk drives and disk arrays. Storage area networks (SANs) also are at the block layer.

In the case where inverted write stack exists, an exemplary embodiment in the method and system of the present disclosure includes a notification mechanism may be put in place where application programs 202 are notified that the file system data 204 underneath them has changed so that the application programs can act appropriately in such situations. For instance, in systems where the write inverted stack exists, application programs may disable their caching mechanisms such that application programs do not work on data cached previously but no longer valid as a result of the file system having been changed.

In another exemplary embodiment, an interface such as an application program interface (API) is provided that allows users to specify and examine data back and forth over time. The interface may include for example a graphical user interface that presents a sliding bar that a user can select, click and slide, or the like, to specify a point-in-time in the history of a file system. The interface may also include a graphical user interface that presents a time dial that a user can select and rotate, or the like, to specify a point-in-time in the history of a file system. As another example, the interface may include a plurality of menu or fields that a user may select or enter or the like, to input parameters needed to specify where in time and which data object the user would like to view or otherwise be presented with. Other interfaces are possible for receiving input parameters including but not limited to command line options, batch files, etc. Application program interface may also include a plurality of subroutines, instructions, or functional modules for rolling file system or data objects back and forth in time. The method and system may also provide similar interface at a file system or a block layer level. Thus, there may be file system or block layer interface routines that similarly can allow time travel.

In an exemplary embodiment, time travel may occur at any layer of data in a computer system, for example, application layer, file system layer, block layer, or the like. Such time travel may be enabled using, for example, the interfaces described above at any layer. In time traveling, write inverted stack is present when there is out-of-band control rather than in-band control. Out-of-band control refers to a case where the command and/or indication to move through time is not in the interface definition between layers. For instance, there may be an application, file system and block layer that all know how to time travel but do not have time in the interfaces between each layer, for example, because time is not a first class data type in the interface definitions. Each of these layers may be time enabled but only through out-of-band control mechanisms. In such cases, there may be a need to send a notification such as signal, rpc, and/or ioctl message to each layer to get it to time travel.

Another instance where an out-of-band control mechanism may be used occurs, for example, when there exists a layer that could not time travel but the layer below it could. A write-inverted stack exists in such cases. Since the layer cannot time travel, an out-of-band control mechanism such as restarting the layer may be used.

In-band control refers to a case where all layers can and know about the time travel. As an example, it may be that an application program has become time enabled, and so has a block layer, but not the file system in-between. In that case, there is a write-inverted stack, even if the application program has a control path to the block layer and can time travel the block layer. On the other hand, if all layers of the stack are time enabled it is not a write inverted stack. In the latter case, all layers have time in their documented interfaces and all know how to do time enabled caching.

Figure 3:
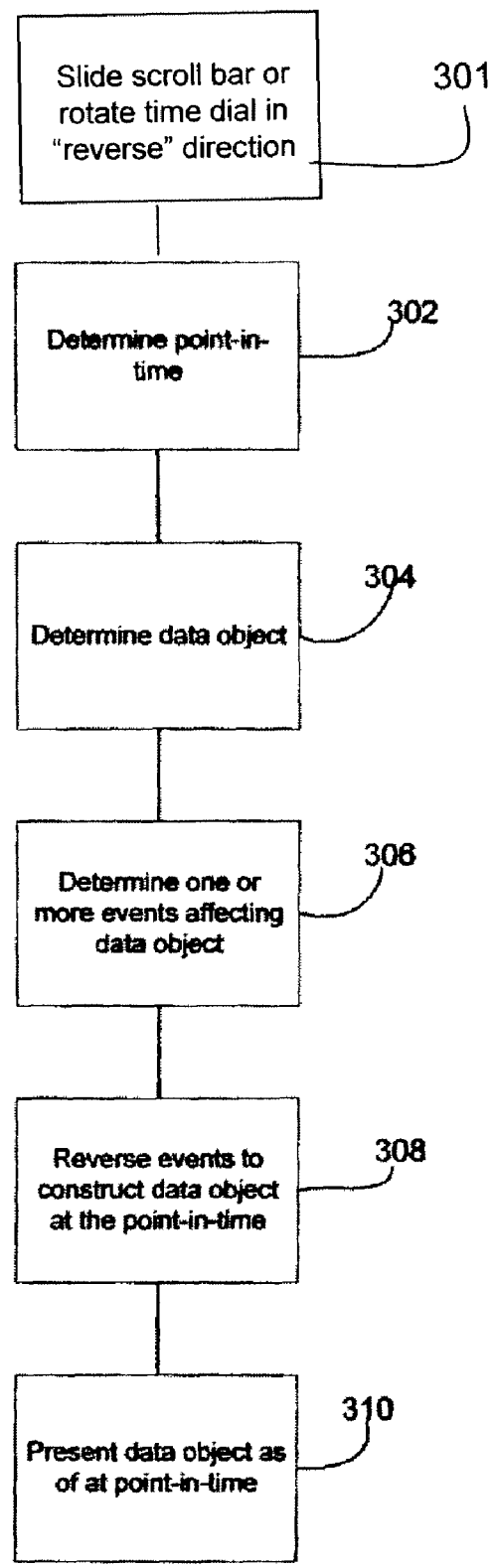
FIG. 3 is a flow diagram illustrating a method of navigating time in one embodiment.

Generally, storage systems are layered as shown in FIG. 2's example. With time travel, layering may cause write-inversion. That is, a layer below has time traveled but the layer above it has not. Typically, writes and updates flow from the layer above down to the layer below. When time travel occurs in one of the lower layers, the data updates flow from the layer below up to the layer above, an inversion of the normal data flow. In order to make the stack internally consistent, the data in the layer below needs to be reflected in the layer above. In an exemplary embodiment, the method and system of the present disclosure provides various ways to overcome the inconsistency in the stack that occurs. There may be put in place an out of band notification between layers so corrective action can be taken. Time parameters can be made a first class data type in the interfaces between layers. In case where the file system is out of sync, that is, application program layer and the block layer have time traveled but the file system layer has not, the file system may be unmounted (umount) and remounted. Other solutions may be possible. In an exemplary embodiment, any one or combinations thereof may be utilized FIG. 3 is a flow diagram illustrating a method of navigating time in one embodiment. In one embodiment, the method provides for selectively reversing in time, changes in a file system, for instance, to data objects such as directories, files, and associated data attributes. A journaling system collects representations of events into an event log. An application program interface enables selectively reversing or altering system operations by file, stream, time, directory and other criteria in addition to global system reversal.

At 302, a point-in-time is determined. This point-in-time reflects the desired time or state in history of a file system at which one would like view or otherwise be presented with a file system or data objects. The point-in-time or the like may be determined, for instance, from a user interface input as described above, such as sliding a time bar or rotating a time dial 301, or any other means. The point-in-time parameter need not be in units of time, but can also be in units of events, states, etc. At 304, a data object or a plurality of data objects to present at the point-in-time is determined. A data object, for instance, can be a file and its content. It can be a file associated with an application program. For example, the data object can be a word processor file, a spreadsheet file, a database table, etc. In one embodiment, all data objects may be selected, for instance, an entire file system, database management system, block layer storage system or the like.

At 306, one or more events that touched or modified the data object since the point-in-time is determined. For instance, the events may be retrieved from an event journal as described with reference to FIG. 1. At 308, those events are undone, for instance, by creating one or more inverse events to reverse one or more changes that affected the data object since the point-in-time, and applying those inverse events to, for instance, the present image of the data object, a copy of it, or a virtual image of it, or the like. In one embodiment, the inverse events may also be saved or stored in an event journal. At 310, one or more data objects reconstructed to reflect its or their state at the point-in-time are presented, for instance, to a user. Briefly, as will be described in more detail with respect to FIG. 4, it is also possible to apply events forward in time.

FIG. 3 illustrates a method in one embodiment that would reverse changes to a file system or data objects contained therein. An exemplary embodiment of the disclosed method and system also contemplates allowing the states of the file system or data objects to be moved forward in time. For instance, data objects moved backward, for example, by the method described with reference to FIG. 3, may be moved forward again in time. For example, a data object may be moved back to point-in-time of one month ago from the present time. After examining the state of the data object one month ago, a user or the like, may want to examine the state of the data object one week forward from that one month time, that is, three weeks ago. One way to present the data at three weeks ago is to repeat the process described with reference to FIG. 3. Another way to present the data at three weeks ago is to reapply the events that occurred from one months ago to one week moving forward to the data at one months ago. For instance, this can be accomplished by updating a virtual image of the data.

In an exemplary embodiment, when moving reference versions of data objects through time, the data that represents the object at the new time can be the reference object, a copy of the reference object or a virtualization, for example, a virtual image of the reference object. If the data that represents the object at the new time is the reference object, that means events are applied directly to the reference object to change its state. For example, the object is a buffer 1024 bytes long. A write event is applied to bytes 1-10 of the object to make it appear as it did at a different time. The buffer for the original reference image is used as the buffer at the new time.

If the data that represents the object at the new time is a copy of the reference object, that means events are applied directly to a copy of reference object to change its state. For example, the 1024 byte buffer is copied to a second buffer and the second buffer has the first 10 bytes changed to represent the object at a different time. The original buffer exists unchanged. The buffer for the copy is used as the buffer at the new time.

If the data that represents the object at the new time is a virtualization of the reference object, that means there is a layer of indirection between the image of the object at the new time and the original reference object. A layer of indirection means operations on the object can be trapped and processed in arbitrary ways. The processing of the operation on the virtual object does not have to directly operate on any specific object, or the processing can operate on one or more objects or the processing can generate synthetic answers.

The processing can include dynamically applying sequences of events. For example, a virtual image of the 1024 byte buffer in the previous examples may be formed from two buffers: the original unchanged reference buffer and a new 10 byte buffer containing the write event. A virtual image of the buffer would satisfy read operations for the first 10 bytes from the 10 byte buffer and reads for the 11-1024 bytes using the original buffer. If a second write event occurred for bytes 1-5, then a second virtualized image may be formed by using the first virtual image.

When a read operation is sent to the second image, which is a virtual object, reads for bytes 1-5 are handled directly, 6-1024 by passing the read to the first virtual image. Alternatively, the second image may be implemented by containing all three buffers within it. Virtualization can apply to data objects such as files, directories, file systems, DBMS, volumes, memory, machines. A person of ordinary skill in art will appreciate that the general concept of virtualizing memories and machines is generally known. That virtualization method may be applied in creating the novel time traveled data in one embodiment of the present disclosure.

Figure 4:
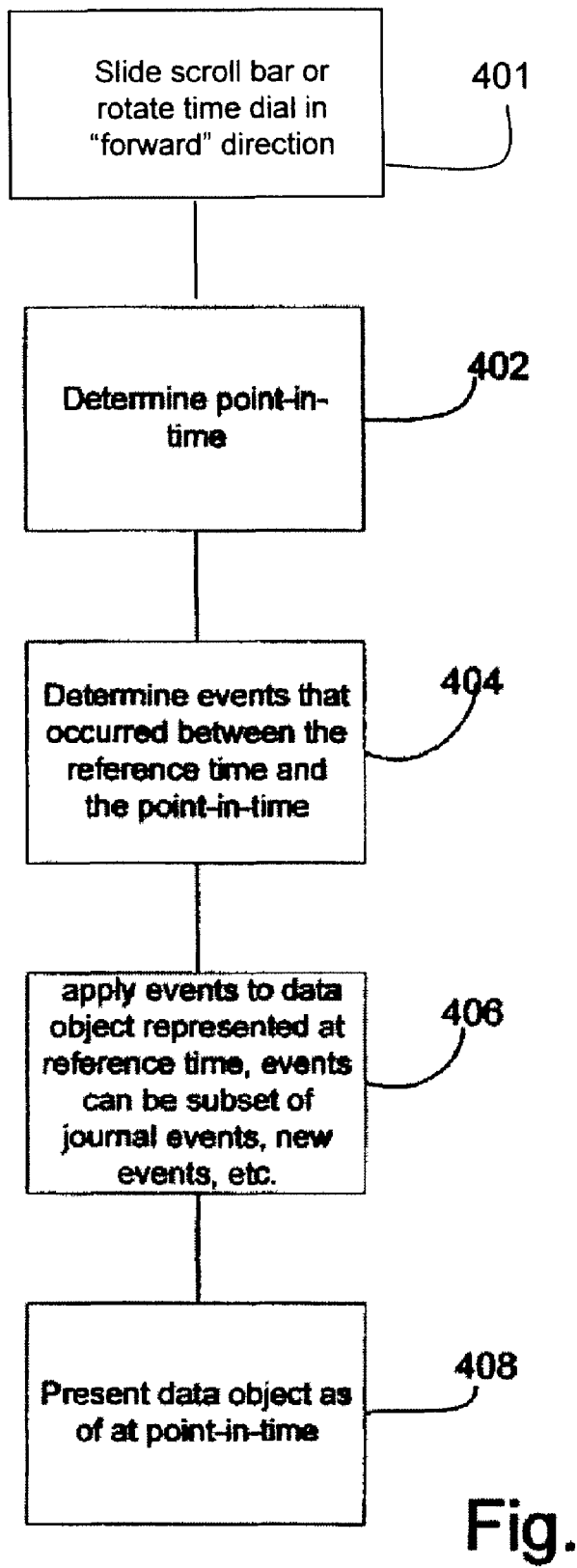
FIG. 4 is a flow diagram illustrating a method of moving data forward in time from the state of being moved back.

FIG. 4 is a flow diagram illustrating a method of moving data forward in time from the state of being moved back. At 402, point-in-time to move the data forward is determined, for instance, from a user interface input as described above, such as sliding a time bar or rotating a time dial 401, or any other means. Again, the point-in-time may be in units of time, state, events, or any other representation of different states of data objects in a history of a file system, database management system, block layer or the like. At 404, one or more events that occurred to change the data object from current reference time to the point-in-time are determined. The current reference time, for instance, denotes the time of the current representation of the data objects. Thus, in FIG. 3, as an example, if the data object was moved backwards one month, the current representation of that data object would be that of one month ago. If the same data object is selected to be moved forward in time, one or more events that occurred between that reference time (for example, one month ago) and the determined point-in-time to which to move forward are determined. The events may be retrieved from an event journal as described with reference to FIG. 1. At 406, the events are applied to the data objects to construct the state of the data objects at the specified point-in-time.

In one embodiment, if data objects to be moved forward in time are different from those that were moved back, the process described with reference to FIG. 3 may be applied to construct the selected data object for representation in point-in-time. For instance, a user using a sliding bar moved a data object back to its state at two weeks ago. The user from that two week point slides the bar forward one week. At that point-in-time, the user requests for a state of a different data object. In that case, the method described with reference to FIG. 3 may be applied to the different data object from the original time rather then from the two-week ago time. This is so since there may not be a representation of that different data object constructed at time two weeks ago. In another embodiment, an initial copy of a data object is made and used as the basis for rolling forward that image, or a copy, or a virtualization of it to any point in time.

In one embodiment, the events applied to reconstruct a data object to its forward-in-time state may be selective or corrective. For example, when constructing a data object from two weeks ago to any time forward, it is not necessary that all events that occurred between that period be applied again. A user, for instance, may select to apply certain events and not apply other events. For example, when applying events the user may alter or correct them or create new events.

The above described events to move data back and forward in time may be applied or operated on an original or a copy of the original file system or a virtual image of the original file system or one or more data objects or the like. For instance, a copy or a virtual image of a file system and its data objects, database system, block layer or the like may be made and operated on, for example, to examine the history of such systems and their changes. Alternatively or in addition, a working system such as a file system, database management system, block layer or the like may be reverted back to a period in time, for instance, to an earlier state.

In an exemplary embodiment, moving backward and forward of data objects in time may be by a particular application, a particular user, a particular group of files, particular areas of a file data stream, as well as by a whole file system, database management system, block layer, or the like, or any combination thereof. Thus, only the events from a specific application, a specific user, those that affect particular groups files, or any combination thereof may be reverted or altered, and applied.

In one embodiment, the time travel can be used to facilitate reconciling and correcting discrepancies or cascaded discrepancies in data or file system. Time travel enables data systems to return to prior times. Temporal navigation can be used to identify and isolate causal events that caused an error, which then can be corrected. The ability to identify causal events in time facilitates reconciliation, enabling identification of the time and particular events that caused a discrepancy. The following illustrates some examples of reconciling data environment using time travel. Time travel can represent a significant advance in the utility of data environments used in conjunction with live environments. Time travel enables identification of both causal events and causal discrepancies. In many cases precedent process repair can facilitate reconciliation by reversing or altering the effects of causal events, therefore, helping to eliminate cascade effects of discrepancies.

By moving data back and forth in time, the history of events and discrepancies can be analyzed and the time of causal events can be determined. In addition, the causal defect can be repaired, for instance, by returning data to time just prior to the causal event. The data system can be restarted and data events other than the causal events replayed. These events can include altered versions of the original events, completely new events, or absence of original events. This process facilitates reducing discrepancies because it eliminates cascaded effects of discrepancies.

For example, a causal effect may create a discrepancy in an inventory system. If a process defect caused the reflective data environment to represent that there was 1 chair in inventory, when there were actually 50, a natural reaction is to trigger a restocking order to be generated causing an additional lot of chairs to be ordered to restock.

An audit would cross-check inventory. The 50 physical chairs would not match the 1 chair represented by the reflective data environment. The causal event is unknown because there is no easy way to know when or why the data system represents 1 chair when there are actually 50.

An audit would compare the live environment inventory, including 50 chairs to the single chair represented in the data environment and produce a discrepancy report. Management next needs to figure out why the inventory is wrong. There are many possible answers. A novel approach is to go backwards in time for the data system. It is known that the chair inventory is 50 today. Sometime after the last audit, there was a causal event that caused the reflective data environment's inventory to be decreased by 49, creating the discrepancy.

Assuming that the last inventory was two months ago, one may successively divide the times, for example, using a binary search algorithm and looking for the specific time when the inventory became incorrect. In this manner the causal event can be isolated in time. One skilled in the art would perform causal effect search. The search would successively divide the time domain until the moment of the causal event was found. A binary search algorithm would generally include:

1. Access the data system 1 month ago and check the chair inventory (=50)—One knows that the causal event occurred in the last month;

2. Access the data system 2 weeks ago and check the chair inventory (=1)—now one knows that the causal event was between one month and two weeks ago;

3. Access the data system 3 weeks ago and check the chair inventory (=50)—now one knows that the causal event was between three and four weeks ago;

4. Access the data system 3½ weeks ago and check the chair inventory (=50)—now the causal event is isolated to within 3½ days;

5. Time is successively divided until a causal event is isolated to an exact time.

The next step in the process is to review the causal event. There are several causal events that may have caused the discrepancy. Assume that a customer made a request order for 49 chairs one day and called back the next day to cancel the order. The first event that decreased the available inventory was correct. The causal event was that the order cancellation was never entered into the system.

This leads to the process analysis. Why wasn't the cancellation entered? Was it a human error? Was it a data entry error? Identification of the causal event usually guides the process correction. In this case there are at least two specific ways to correct the data system to repair the mistake. The first is to repeat the event series omitting the original, later cancelled order. The second is to repeat the event series including both the original order and subsequent cancellation.

The first approach provides the novel benefit eliminating the entire cascade of discrepant conditions in the data system. The second approach also eliminates the cascade of discrepant conditions in the reflective data environment if the event sequence is replayed using the missing cancellation as the discrepant event.

There are often multiple ways to correct a discrepancy. It is an aspect of this application to analyze both approaches to determine the best way to correct the discrepancy based on a preferred strategy. The preferred strategy may depend on collateral and business parameters, including economic or operational parameters. An example of an operational preference may need an assumption. Assume that salesmen receive commissions on all placed orders. Cancelled orders do not negate the sales commission for the salesman. This example illustrates a preferred strategy from the salesman's point of view. The salesman would prefer reconciliation by inclusion of the cancel-order record instead of elimination of the entire order. This way the salesman would still receive his commission. This model would favor the salesman and potentially has an operational benefit.

A similar but inverse example is the following. Assume the same example above except that the management policy is to avoid payment for all cancelled orders. Resumption, by omitting the original sales order would leave no record in the data environment that the salesman made the sale. Therefore the salesman would not receive a commission. This is an example of reconcile with an economically defined preferred strategy.

An exemplary characteristic is the ability to define a reconciliation strategy using desired outcome and time-travel to minimize operational or economic factors. It also presents means to eliminate effect discrepancy across time subsequent to reconciling a causal event.

As another example, assume the example above, absent the time travel. The previous example discussed correction of the data environment. This is one approach to the problem. The data environment was amended to reflect the correct number of chairs in inventory. Another solution is possible. Manipulating the live environment to achieve consistency with the data environment is an alternative in some cases.

Another possible live environment activity is to adjust the live environment process. Assume that the salesman cited above repeatedly entered incorrect order entries. This pattern might imply a process problem requiring manipulation of the live-system process. For example, a process correction to the live environment may require a manager to authorize order entries by the frequently errant salesman.

This example illustrates that reconciliation activity may operate in a live environment. In this example, physically removing the extra chairs, and increased management supervision were manipulations that occurred entirely in the live environment without affecting the data environment.

It is also exemplary to make changes to both data and live environments. Example 1 manipulated the data environment by correcting the causal event that led to the cascaded discrepancy. Another exemplary approach to reconciliation often affects both the live and data environments. Briefly, the data environment would be repaired as in example one. And assuming a frequently errant salesman, the management process correction, causing management supervision described in the second example would provide an exemplary approach.

In one embodiment, an interface for enabling time travel may include application level, file system level, or block layer level operations, or combinations thereof. Examples of such interface is described in U.S. Provisional Application No. 60/627,544. Those examples illustrate using time or the like as a parameter or a class type in various operations involving data objects and metadata of the data objects so that time travel is enabled.

The system and method of the present disclosure may be implemented and run on a general-purpose computer. The components described herein may reside in one computer or be distributed across a plurality of computers and networks. The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A computer comprising a processor and a storage medium, said storage medium comprising:
   a. instructions for causing the processor to time shift a subset of a plurality of data objects stored on the storage medium;
   b. one or more application programs for performing actions on files or data objects;
   c. a block layer for storing data generated from the one or more application programs;
   d. a file system through which changes made to a data object in the one or more application programs travel to, and are stored in, the block layer;
   e. one or more write-inverted stacks, whereby one or more data objects stored in the block layer have time-shifted but their corresponding one or more application programs are unaware that the one or more data objects have time shifted;
   f. an event journal containing a plurality of time-labeled events representing changes made to the plurality of data objects;
   g. an application program interface which includes one or more graphical user interface modules for selecting a subset of the data objects to time shift; said interface modules also operable to select a past temporal state and a forward temporal state of the subset of data objects;
   h. instructions for causing the processor to generate and apply a reverse event from the plurality of events operable to change the subset of data objects to the past temporal state;
   j. instructions for causing the processor to generate and apply a forward event from the plurality of events operable to change the subset of data objects to the forward temporal state;
   k. instructions for causing the processor to determine that one or more data objects stored in one or more block layers have been time shifted;
   l. instructions for notifying the corresponding file system and one or more application programs that the one or more data objects have been time shifted; and
   m. instructions for causing the corresponding file system and one or more application programs to synchronize with the one or more time-shifted data objects.

2. The computer of claim 1 wherein the interface module comprises a slider, wherein movement of the slider in a first direction causes the processor to apply the reverse event to change the subset of data objects to the reverse temporal state; and movement of the slider in a second direction causes the processor to apply the forward event to change the subset of data objects to the forward temporal state.

3. The computer of claim 1 wherein the interface module comprises a time dial, wherein rotation of the time dial in a first direction causes the processor to apply the reverse event to change the subset of data objects to the reverse temporal state; and rotation of the time dial in a second direction causes the processor to apply the forward event to change the subset of data objects to the forward temporal state.

4. The computer of claim 1 wherein the event journal contains supplemental criteria about the one or more time-labeled events, including a user name of who carried out the event.

5. The computer of claim 1 wherein the storage medium contains instructions causing the processor to generate and apply a reverse event based on user-selected supplemental criteria to change the subset of data objects to the past temporal state.

6. A method of time shifting a subset of a plurality of data objects stored on a storage medium; said method comprising the steps of
   a. using a computer comprising a processor and the storage medium, said storage medium comprising:
      i. an event journal containing a plurality of time-labeled events representing changes made to the plurality of data objects;
      ii. an application program interface which includes one or more graphical user interface modules for selecting a subset of the data objects to time shift; said interface modules also operable to select a past temporal state and a forward temporal state of the subset of data objects;
      iii. one or more application programs for performing actions on files or data objects;
      iv. a block layer for storing data generated from the one or more application programs;
      v. a file system through which changes made to a data object in the one or more application programs travel to, and are stored in, the block layer;
      vi. one or more write-inverted stacks, whereby one or more data objects stored in the block layer have time-shifted but their corresponding one or more application programs are unaware that the one or more data objects have time shifted;

b. instructing the processor to generate and apply a reverse event from the plurality of events operable to change the subset of data objects to the past temporal state;

d. instructing the processor to generate and apply a forward event from the plurality of events operable to change the subset of data objects to the forward temporal state;

f. instructing the processor to determine that one or more data objects stored in one or more block layers have been time shifted;

g. instructing the processor to notify the corresponding file system and one or more application programs that the one or more data objects have been time shifted; and h. instructing the processor to cause the corresponding file system and one or more application programs to synchronize with the one or more time-shifted data objects.

7. The method of claim 6 comprising the step of moving a slider, wherein movement of the slider in a first direction causes the processor to apply the reverse event to change the subset of data objects to the reverse temporal state; and movement of the slider in a second direction causes the processor to apply the forward event to change the subset of data objects to the forward temporal state.

8. The method of claim 6 comprising the step of rotating a time dial, wherein rotation of the time dial in a first direction causes the processor to apply the reverse event to change the subset of data objects to the reverse temporal state; and rotation of the time dial in a second direction causes the processor to apply the forward event to change the subset of data objects to the forward temporal state.

9. The method of claim 6 wherein the event journal contains supplemental criteria about the one or more time-labeled events, including a user name of who carried out the event.

10. The method of claim 6 instructing the processor to generate and apply a reverse event based on user-selected supplemental criteria to change the subset of data objects to the past temporal state.

\* \* \* \* \*